April 21, 1964 C. E. WADE, JR 3,129,866
EGG CARTON
Filed July 19, 1961 5 Sheets-Sheet 1

INVENTOR
Charles E. Wade Jr.
BY Connolly and Hutz
ATTORNEYS

April 21, 1964     C. E. WADE, JR     3,129,866
EGG CARTON
Filed July 19, 1961                               5 Sheets-Sheet 2
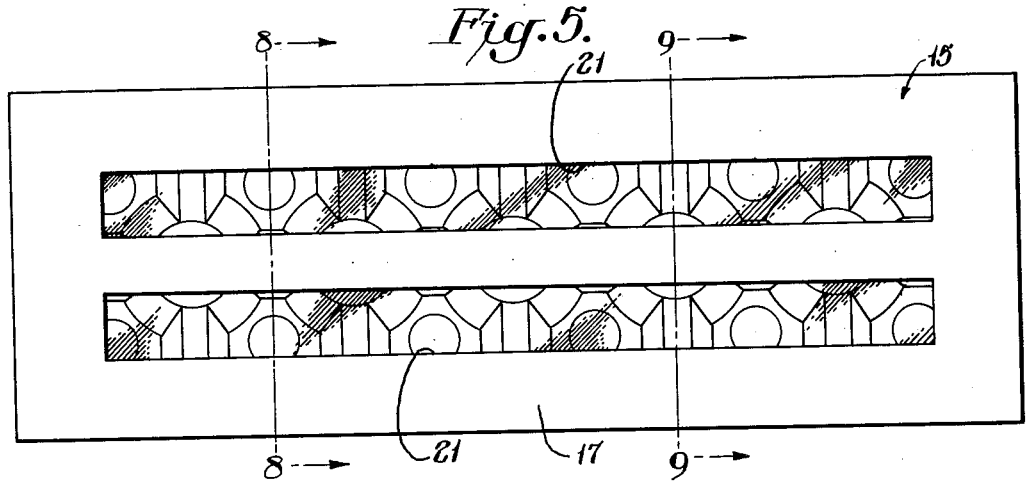
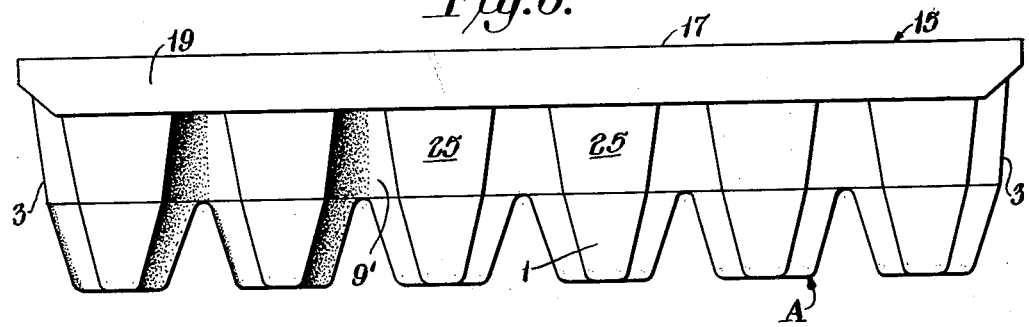
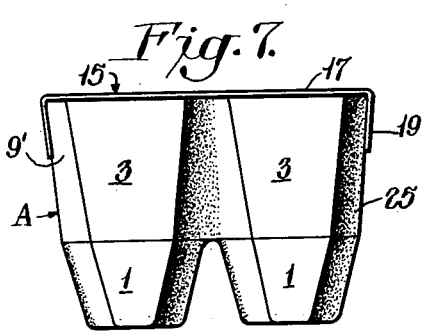
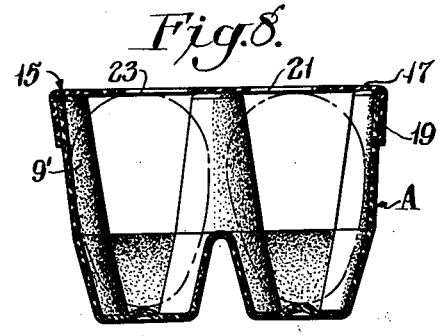
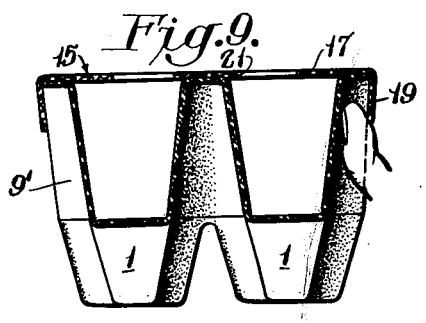
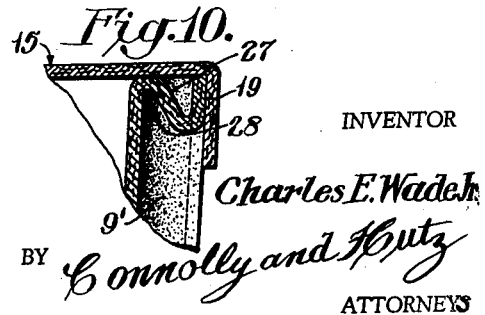
INVENTOR
Charles E. Wade Jr.
BY Connolly and Hutz
ATTORNEYS April 21, 1964  C. E. WADE, JR  3,129,866
EGG CARTON
Filed July 19, 1961  5 Sheets-Sheet 3
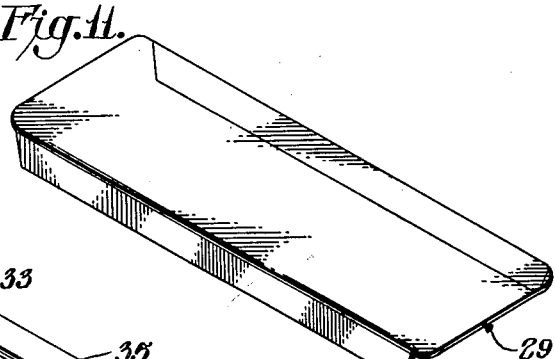
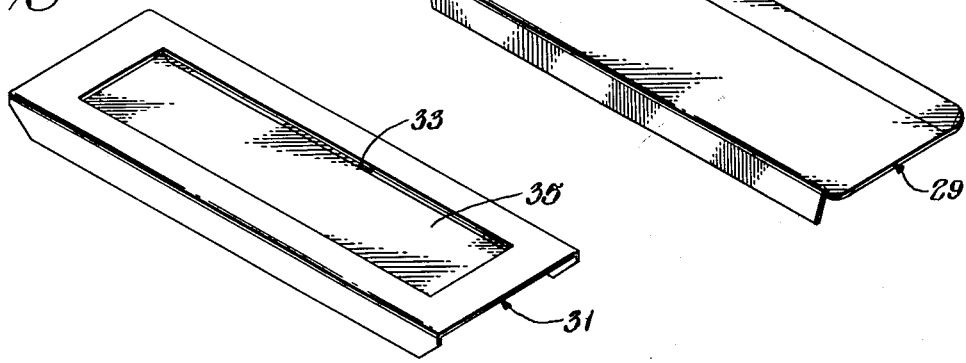
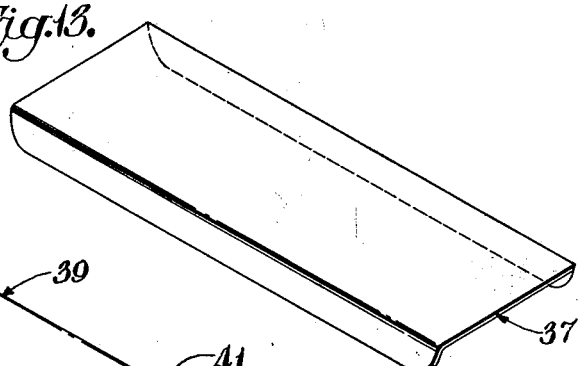
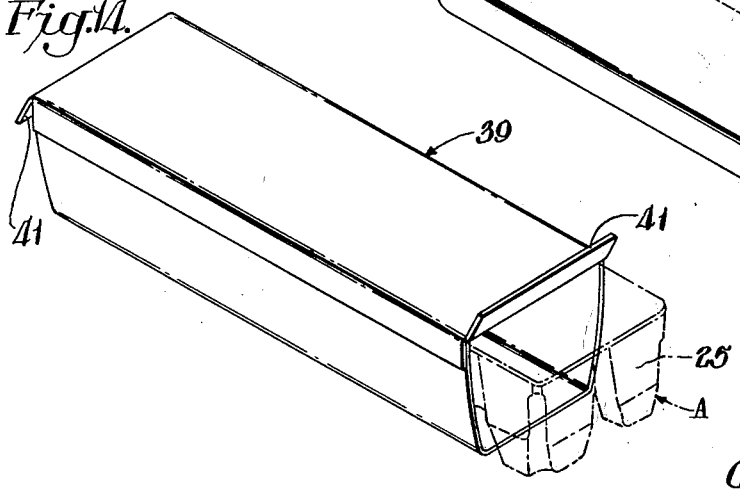
INVENTOR
*Charles E. Wade Jr.*
BY *Connolly and Hutz*
ATTORNEYS

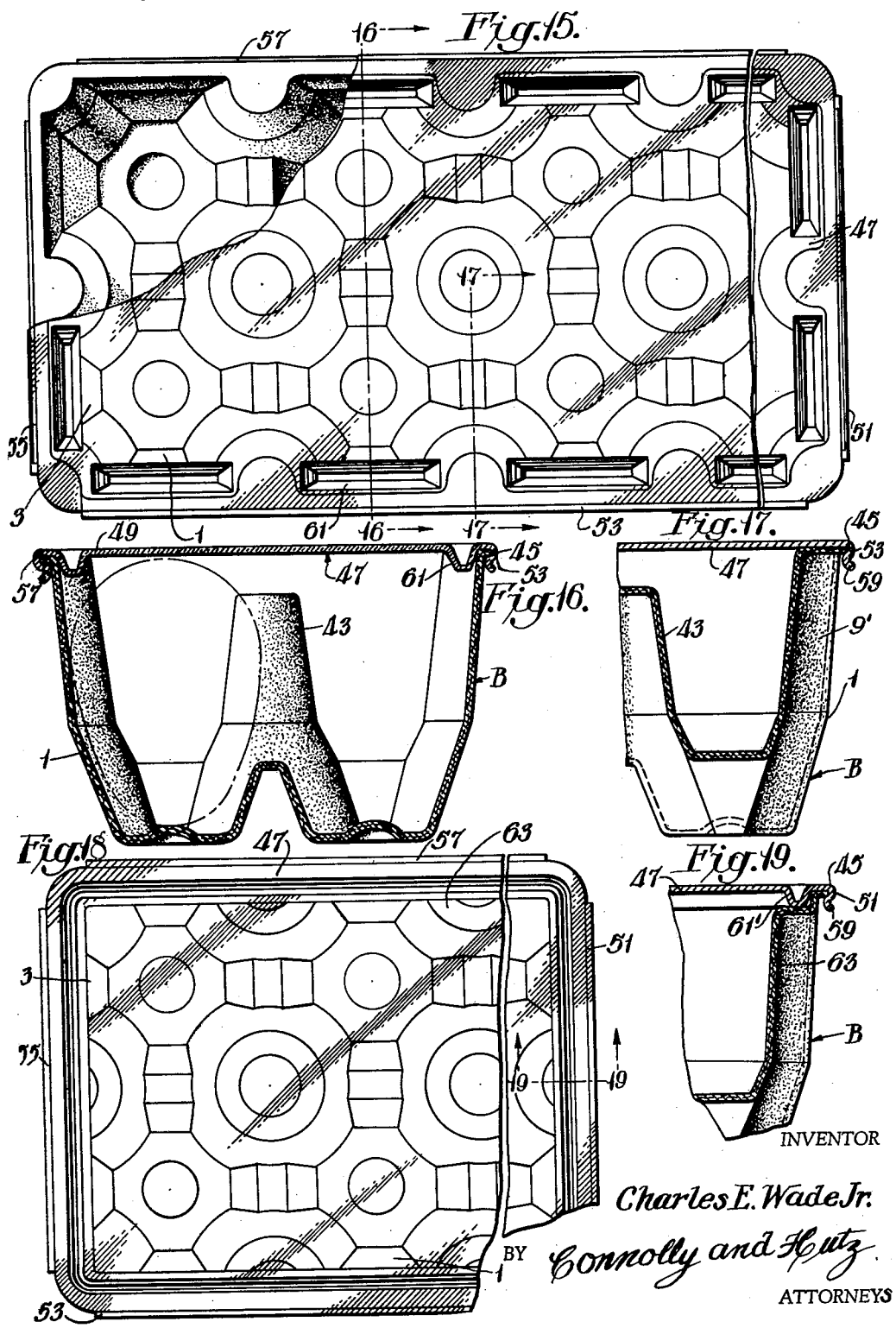

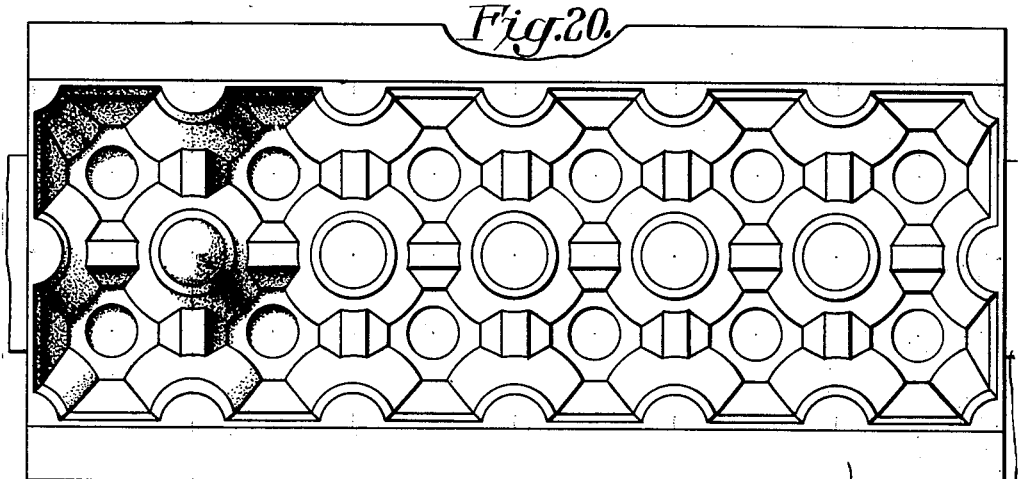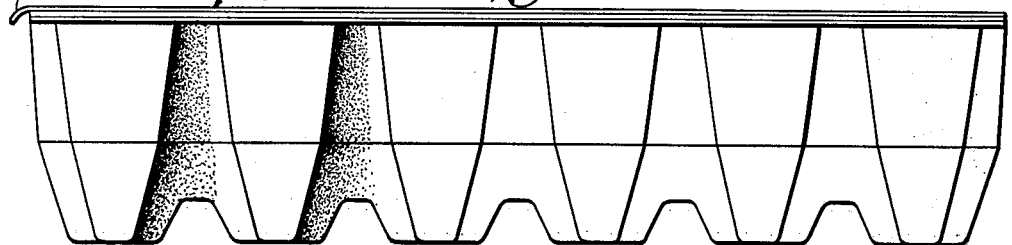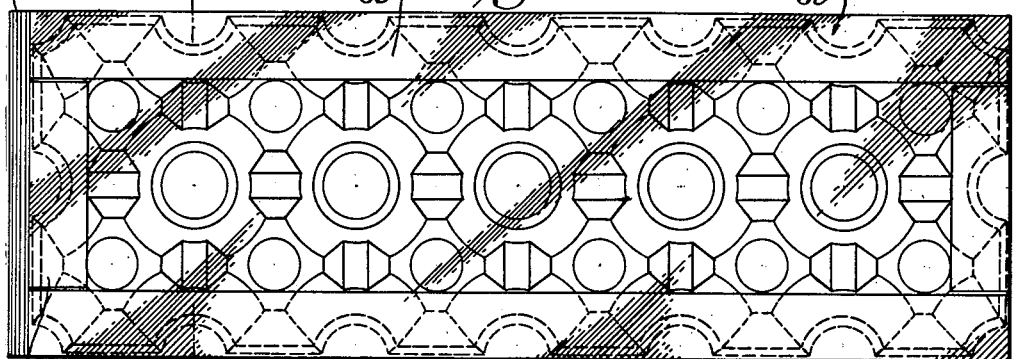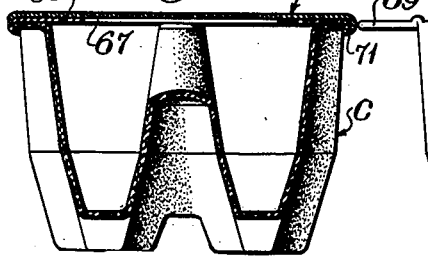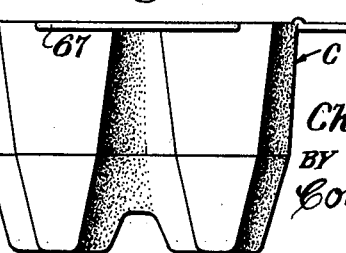

United States Patent Office
3,129,866
Patented Apr. 21, 1964

3,129,866
EGG CARTON
Charles E. Wade, Jr., P.O. Box 1591, Roanoke, Va.
Filed July 19, 1961, Ser. No. 125,170
9 Claims. (Cl. 229—2.5)

The present invention relates to a novel and improved egg carton. More particularly, the present invention relates to a molded pulp egg carton having side and end walls extending upwardly to at least the top end of the eggs to be supported in the carton.

Generally, eggs from the farm are delivered to a handling, sizing and packaging center where the eggs are packaged in cartons which contain one dozen eggs. The cartons are then crated in standard size crates holding thirty dozen eggs. After being crated, the eggs are shipped to the retailer, who displays the individual cartons for sale on suitable counters or in coolers.

One extremely vexing problem that confronts the carton manufacturer is that each wholesale or retail outlet demands that his name, trademark or design be printed directly on the egg carton. As a result, the carton manufacturer must maintain on hand a tremendous variety of printing plates and other printing equipment in order to take care of each customer.

The consumer or ultimate purchaser of packaged meats, vegetables and fruits is demanding more and more that the contents of such packaged foods be visible for examination and inspection. Accordingly, packaging food items in transparent or semi-transparent packages is becoming of ever-increasing importance. This same demand is present in the field of packaging eggs.

In addition to the above demands of the wholesaler, retailer ant ultimate purchaser, individual egg cartons have been substantially standardized in size in order to permit the packaging of a predetermined number of such cartons within a standard case or crate.

It is an object of the present invention to provide a novel and improved substantially open-top egg carton which may be provided with a cover member permitting inspection of the eggs packaged therein and on which the name, trademark and/or design of the seller may be printed.

Still another object of this invention is to provide an egg carton comprising a one-piece section having side and end walls extending upwardly to at least the top end of the eggs to be supported therein while complying with the standardized dimension requirements of the industry, as well as with the aforesaid object.

Another object of this invention is to provide an egg carton complying with the foregoing objects and in addition also providing improved breakage protection for the eggs packaged therein.

Additional objects and advantages of this invention will become apparent upon considering the following description and drawings wherein:

FIG. 5 is a top plan view of a carton similar to that of FIG. 1 but including a cover member;

FIG. 6 is a side elevation view of the carton of FIG. 5;

FIG. 7 is an end elevation view of the carton of FIG. 5;

FIG. 8 is a sectional view taken along the line 8—8 of FIG. 5;

FIG. 9 is a sectional view taken along the line 9—9 of FIG. 5;

FIG. 10 is a fragmentary view in cross section illustrating a modification of the carton of FIGS. 5–9;

FIGS. 11–13, inclusive, are perspective views, respectively, of modified forms of the cover member suitable for use with the carton of FIGS. 1–4;

FIG. 14 is a perspective view of a sleeve member usable with the carton of FIGS. 1–4, the carton of FIGS. 1–4 being shown in phantom;

FIG. 15 is a top plan view of a further egg carton of the present invention with a portion of the top cover section thereof broken away to more clearly illustrate the construction of the carton proper;

FIG. 16 is a cross sectional view taken along the line 16—16 of FIG. 15;

FIG. 17 is a cross sectional view taken along the line 17—17 of FIG. 15;

FIG. 18 is a partial top plan view of another embodiment of the present invention;

FIG. 19 is a cross sectional view taken along the line 19—19 of FIG. 18;

FIG. 20 is a top plan view of a further embodiment of the present invention;

FIG. 21 is a side elevational view of the carton of FIG. 20 having the side and end flaps folded inwardly and a transparent cover member applied thereto;

FIG. 22 is a top plan view of the egg carton of FIG. 21;

FIG. 23 is a cross sectional view taken along the line 23—23 of FIG. 22; and

FIG. 24 is an end elevational view of the carton of FIG. 20.

Figure 1:
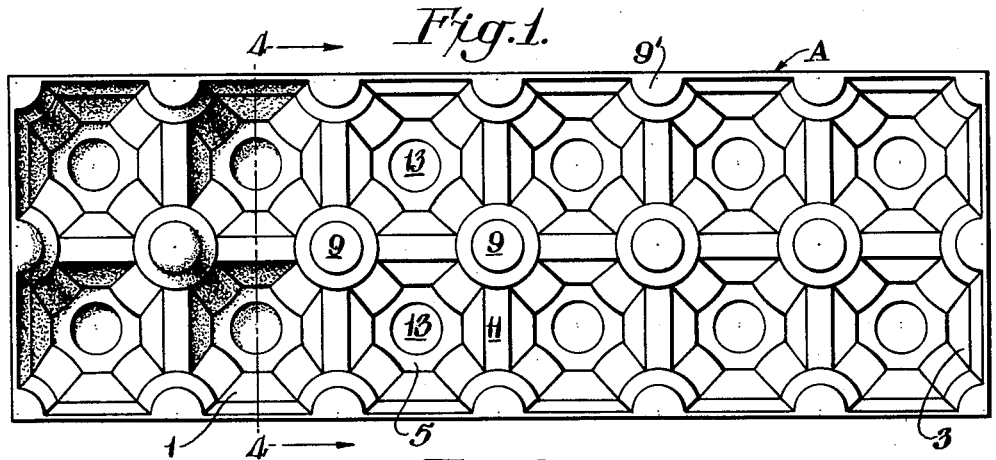
FIG. 1 is a top plan view of one form of egg carton in accordance with the present invention.
Figure 2:
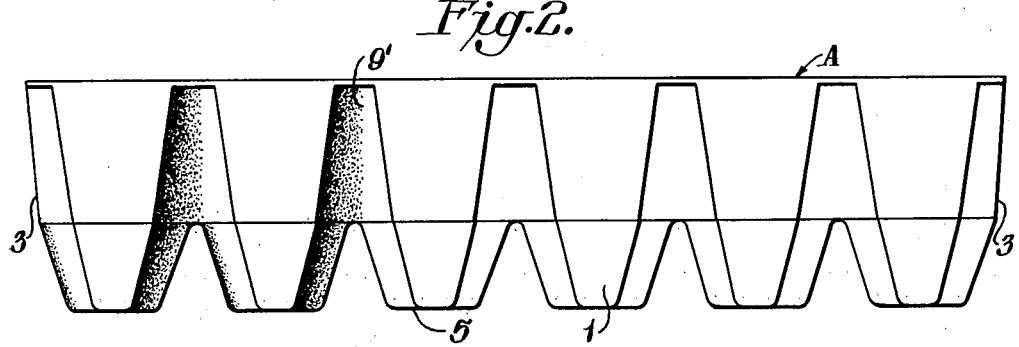
FIG. 2 is a side elevation view of the carton of FIG. 1.

With reference to the drawings, a preferred embodiment of the egg carton of the present invention as illustrated in FIGS. 1–4 will now be described in detail. As seen in FIGS. 1 and 2 of the drawings, the egg carton generally indicated by the letter A, comprises side walls 1, end walls 3 and a bottom portion generally indicated by reference numeral 5. As seen more clearly in FIG. 4, the end and side walls are of such a height that they extend to at least the top ends of eggs such as E in a position within the carton A.

The carton A is preferably formed of a material which is capable of being molded as a single unit. Fibre pulp is generally satisfactory for use in forming this egg carton. Other suitable materials may be used, however, such as light strong plastic material which may be molded as a one-piece unit.

As more clearly seen in FIG. 1, the egg support elements include a series of centrally disposed egg positioning posts 9 and peripherally disposed half posts 9'. Preferably there are a total of three longitudinally extending lines of posts 9 and 9' which extend in substantially straight lines and spaced-apart manner from one end wall 3 to the opposite end wall 3 of the carton A. These posts 9 and 9' are preferably also so disposed that they form substantially straight lines in spaced-apart manner transversely of the carton.

As further seen in the drawing, the posts 9 disposed along the longitudinal center line are of a truncated cone shape with the wider portion of the post adjacent the bottom portion 5, while the posts 9' along and immediately adjacent the end and side walls assume the shape of a truncated vertically split cone with the curved surface thereof facing the carton interior with the wider portion of the posts adjacent the bottom portion 5. With this arrangement every two adjacent posts 9 disposed along the center line of the carton A, including the end posts 9' at the extreme ends of the line, cooperate with the opposite two adjacent posts 9' in both lines of posts 9' running along the side walls 1 and 3 to aid in supporting and positioning an egg therebetween in an endwise and upright position. The posts 9 and 9' are of the above mentioned shape so that, when the egg is packaged in its normally packaged position with the inwardly tapering or narrow end of the egg adjacent the bottom panel 5, the upwardly narrowing taper of the posts 9 and 9' will provide contacting support for the egg E as it extends upwardly to the top of the carton A.

In addition to the support provided by the posts 9 and 9', raised connecting ribs 11 serve to connect each adjacent post along the bottom post portions whereby a lower egg-seating pocket 13 is provided between every above mentioned set of egg supporting posts. Thus, posts 9 and 9' and associated ribs 11 firmly support the eggs in position within the carton A.

Since the carton A is preferably formed of a single unit of molded material, the posts 9 which extend along the longitudinal center line of the carton A are therefore hollow and constitute upwardly projected portions of the bottom portion 5. The posts 9' which are positioned immediately adjacent the side and end walls 1 and 3 are formed of inwardly projected portions of the walls 1 and 3 as may be seen more clearly in FIGS. 2 and 3 of the drawing which show side and end views of the carton A from the exterior side of the carton.

Figures 3, 4:
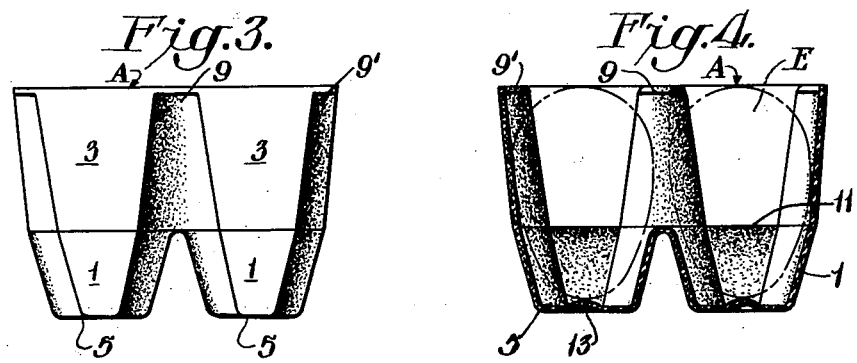
FIG. 3 is an end elevation view of the carton of FIG. 1.
FIG. 4 is a section taken along line 4—4 of FIG. 1 including phantom illustration of eggs packaged within the carton.

FIG. 4 is a section taken along line 4—4 of FIG. 1 and shows in better detail the posts 9 and 9' as they are disposed within the carton A. The connecting ribs 11 are also seen in this figure. As further noted in FIG. 4, the posts 9 and 9' extend to a height which substantially corresponds to the height of the walls 1 and 3.

With reference to FIGS. 5–9 of the drawings, the carton there illustrated is like that described in connection with FIGS. 1–4 inclusive, but includes a top cover member generally indicated as 15. This top cover member may be formed from paper, cardboard, corrugated board or even molded pulp and preferably comprises a top portion 17 with depending side skirts 19. For the purpose of permitting a potential customer to view the contents of the carton in order to determine the condition, color and size of the eggs packaged therein, the cover member 15 preferably contains one or more longitudinally arranged cutout areas 21 as shown. These areas in turn may be provided with a transparent film covering 23 preferably applied to the undersurface of the top portion 17 by adhesive or other well known attaching means. Such a transparent window-like arrangement permits customer viewing of the carton contents while preventing foreign matter from entering the carton proper.

With further reference to FIGS. 5–9, it will be noted that the upper areas of the side walls and end wall portions of the carton A extending between half posts 9' and designated by numeral 25, are substantially flat and coplanarly arranged in their respective sides and ends 1 and 3. This substantial flat coplanar arrangement of the side walls provides a substantial surface area permitting the skirts 19 of the cover member 15 to be fastened thereto by adhesive, stapling or other desired means, preferred attaching means being a pressure sensitive adhesive. This arrangement has a number of advantages. One, as shown in FIG. 9, is that finger insertion is permitted in the half post areas underneath the side wall flaps 19 of the cover member. Upon finger pressure application, one or both of the sealed flaps 19 may be detached from the carton side walls 1 and thereby permit convenient access to the carton. This fibrous nature of the molded pulp side wall 5 permits ready stripping of the flap 19 without destroying the supporting thickness of the pulp side walls 1. Hence, the opened carton is still available for refrigerator storage, if desired.

Another advantage associated with the coplanar areas 25, located between half posts 9', is that the length of the side flaps 19 of cover member 15 may be selected to provide whatever area is necessary for printing the name, trademark or design of the wholesale or retail outlet for the packaged carton. Additionally, and most important-ly, printing on the cover member 15 in any selected areas, eliminates the necessity of the molded pulp carton manufacturer of maintaining, on hand, a tremendous variety of printing plates and other printing equipment. Instead, a cover member such as 15 may be manufactured in the area of carton use by printing on cardboard or other selected cover material, in accordance with the customer's cover design dictates.

FIG. 10 illustrates a modification of the carton A including cover member 15 as hereinbefore discussed. As will be appreciated, the egg carton packaging industry of today has become a highly mechanized operation. Thus, the cover member 15 would normally be applied by mechanism which would place the cover member on top of the egg filled carton A while applying a bonding agent to the areas 25 of the carton A and/or the inner surfaces of the side flaps 19 of the cover 15. Thereafter, the carton with the cover 15 placed in position would normally be conveyed through apparatus which would force the flap members 19 against the areas 25 to obtain bonding between the cover and the carton. Suitable apparatus for this purpose could include roll contact means or plate contact means positioned to obtain the contact necessary for bonding. If substantial bonding pressure were applied for this operation, it is conceivable that egg damage could occur.

The embodiment of FIG. 10 includes means permitting application of a holding force against the side walls 1 of the carton so as to overcome any undue pressure on the eggs during the aforementioned bonding operation. The preferred means, as illustrated, is a Z-shaped recess formation 27 in the upper end of each of the half posts 9'. Rigid mechanical finger insertion upwardly into the area 28 during bonding overcomes any force tending to damage eggs within the carton and assures the necessary "back-up" means to obtain adequate pressure contact for the bonding operation.

FIGS. 11–13 illustrate cover member embodiments representing variations of the cover member 15 as depicted in FIGS. 5–10, inclusive. Thus, the cover member 29 of FIG. 11 is made of plastic or other relatively stiff, transparent material and may be applied in the same manner as that described in connection with cover member 15. The cover member 31 of FIG. 12 is similar to that of FIG. 5 but includes a larger and single cut out area 33 which may include transparent window member 35. The cover member 37 of FIG. 13 is similar to cover member 29 of FIG. 11, but is of opaque or translucent material such as cardboard. Although cover 37 does not permit viewing of the contents of the carton, it offers a substantial and convenient area for carton printing if the wholesaler or retailer desires the same.

FIG. 14 is directed to a sleeve member 39 similar to well-known egg carton sleeves, but preferably including end flap members 41 which may be applied to the flat areas 25 of the end walls of the carton A in a manner as described above in connection with flaps 19 of the cover member embodiment 15 of FIGS. 5–10. These end wall flaps 41 also serve the function of retaining carton A within the confines of the sleeve 39 until the customer ruptures the sealing bond between the inner surfaces of the flaps 41 and the flat areas 25.

With reference to the embodiment of FIGS. 15–17 herein, the egg carton B is similar to egg carton A, corresponding parts being designated by corresponding numerals, and differs primarily with respect to the height of the center posts 43 and the flanges 45 about the upper peripheries of the side and end walls, 1 and 3, respectively. The reduced height of center posts 43 is an optional feature and is, of course, applicable to the carton A embodiment. Whereas the reduction of the height of these posts may facilitate removal of the first egg from the carton, it has the possible disadvantage of affording less protection to the eggs packaged within the carton. Thus, and unless the cover member is of fairly stiff material, pressure exerted on top of the cover member such as occurring during the packaging of a plurality of egg cartons, one upon the other within a case, could cause egg damage. Where it is desired to facilitate egg removal from the carton without sacrificing full protection as afforded by a center post of a height corresponding to that previously described in connection with posts 9, other measures may be employed. Thus, a portion of a flat area 25, preferably positioned at a corner of the carton, may be cut away to permit finger contact on one side of the egg at the cutout area and further finger contact at an opposite side thereof. Similarly, an opening may be included in the bottom of the carton, preferably in a pocket adjacent one corner of the carton. This opening can be made large enough to permit finger insertion to push the egg upwardly and yet not detract from proper egg support. Additionally, the middle center post or any other selected post 9 may be of reduced height, e.g., one-half of its normal height or less, and the remaining parts may be of full height. Other measures such as a tab adhesively attached to the top of one corner positioned egg, etc. will occur to those skilled in the art.

The peripheral rim 45 disposed in the horizontal plane and coplanar with the tops of peripherally disposed half posts 9' is for the purpose of accommodating a cover member 47. Cover member 47, preferably of a transparent plastic material such as polyvinyl acetate, polyvinyl chloride, polystyrene, etc. and of a thickness, e.g., 5 to 20 mils, to be self-supporting, includes a top portion 49 of substantially the same dimensions outlined by peripheral edge 45 of the carton as well as downwardly and inwardly depending resilient skirt portions 51, 53, 55 and 57. Each depending skirt portion preferably includes an inwardly and then outwardly turned free end portion 59 which serves as additional means for locking the cover 47 in fixed position about the peripheral edge 45 of the carton B. In this connection, it will be noted that each of depending skirts 51, 53, 55 and 57 are of less length than its associated peripheral edge carton dimension. The purpose of this arrangement is to present a tight fitting cover member 47 while accommodating change in carton dimensions occurring as a result of molding operations. Thus, as understood by those skilled in the art of pulp molding, molded pulp items are not necessarily of uniform dimension because of minor amounts of pulp shrinkage and warpage occurring during drying and finishing operations.

As also shown in FIGS. 15-17, a preferred form of carton top member 47 includes a plurality of downwardly extending rib-like projections 61 which are spaced inwardly of the depending skirts 51, 53, 55 and 57 a distance equal substantially to the width of peripheral rim 45, i.e., a distance for interlocking cooperation with the top edges of the side and end walls 1 and 3 of carton B. It will be noted that the rib-like members 61 are of a length and spacing to be accommodated between adjacent peripherally disposed posts 9'. Rib-like members 61 positioned in this manner together with skirts 51, 53, 55 and 57 preferably including means 59, serve for more secure fastening of cover member 47 to carton B without interfering with the effective egg receiving volume within the pockets defined by the posts, side walls and connecting rib members.

With reference to the embodiment of FIGS. 18-19 wherein reference numerals corresponding to those employed in FIGS. 15-17 correspond to similar parts, it will be noted that peripherally disposed posts 63 are of a lesser height than the corresponding posts of the previously described embodiment. This decrease in height is at least as great as the depth of the rib members 61 and thereby permits a continuous rib member 61' to be employed in conjunction with skirt members 51, 53, 55 and 57 and their associated means 59.

FIGS. 20-24, inclusive, depict a further embodiment of an egg carton in accordance with the present invention and generally designated as C. Parts of egg carton C corresponding to those of egg carton A are designated by like numerals. Carton C includes side flaps 65 and end flaps 67. These flaps when folded inwardly provide an attaching support for a top cover of the carton as well as protection for the contents and stiffening means along the top edge of the carton. The flaps 65 and 67 are folded inwardly towards the carton interior until they rest upon the tops of the posts 9' peripherally disposed along the side and end walls 1 and 3 of the carton C. The posts which are of substantially the same height as the walls of the carton C limit the inward folding of the flaps to a position substantially at right angles to the walls of the carton. FIGS. 20 and 24 show the position of the flaps 65 and 67 before they are folded inwardly and FIGS. 21-23 show the side and end flaps 65 and 67 in their inwardly folded position resting upon the tops of the peripherally disposed posts 9'.

FIGS. 21-23 show the carton C with the top cover 69 in position after being applied to the carton. As seen therein, the top cover 69 comprises a thin sheet which is fixed in position on the carton C by adhering the top cover 69 to the upper surface of the inwardly folded side and end flaps 65 and 67 and, if desired, around the ridge 71 as shown more clearly in FIG. 23. As seen more clearly in FIGS. 21 and 22, the top cover 69 extends for a distance beyond one end of the carton to provide a pull tab 73 whereby the top cover 69 may be easily removed from the carton by gripping the pull tab 73 and pulling the top cover 69 back along the body portion C.

The top cover 69 is preferably formed of a heat-sealable thin flexible sheet or film which may be applied to the carton by means of a heat seal. However, the top cover may be applied by the use of suitable adhesives when other than heat-sealable material is used for the top cover.

As mentioned above, it is desirable in the packaging field to provide a packaged article or articles wherein the purchaser may observe the contents within the container. It is therefore preferable in the present invention to use a transparent cover 69 whereby the carton contents may be easily observed. There are numerous transparent flexible films on the market today which may be used for this purpose. These films may be a thermoplastic (heat sealable) or nonthermoplastic nature. Among these films cellophane having a heat sealing coating is very satisfactory.

This application is a continuation-in-part of copending application, Serial No. 837,510 as filed September 1, 1959, now abandoned, and application Serial No. 837,509 as filed September 1, 1959, now abandoned.

The foregoing description of the present invention is for illustration purposes only and is not limiting to the scope thereof which is set forth in the claims.

What is claimed is:

1. A molded egg carton comprising end walls, side walls and a bottom portion, a plurality of spaced-apart egg supporting posts extending upwardly from the bottom portion and positioned to define individual egg receiving pockets within said carton, said supporting posts including inwardly extending half posts positioned along the side and end walls of the carton, said end and side walls extending to such a height above the bottom portion that the top edges of said walls extend to at least the top ends of eggs when positioned within said egg receiving pockets, a cover member for said carton, said cover member including a top portion of substantially the same dimensions outlined by the top edges of said end and side walls and a downwardly and inwardly depending skirt extending from each of two opposite edges of said top portion, each said skirt being sealed, on initial carton closure, to its adjacent carton wall at points lying between said half posts and terminating at a point above said bottom portion at a position overlying at least the upper ends of adjacent half posts whereby the seal of one of said skirts may be broken for carton opening by fingertip pressure on insertion into adjacent half posts underneath the edge of said sealed skirt.

2. The molded egg carton of claim 1 wherein said half posts are of a height corresponding to the height of the side and end walls.

3. A molded egg carton comprising end walls, side walls and a bottom portion, a plurality of spaced-apart egg supporting posts extending upwardly from the bottom portion and positioned to define individual egg receiving pockets within said carton, said supporting posts including inwardly extending half posts positioned along the side and end walls of the carton, said end and side walls extending to such a height above the bottom portion that the top edges of said walls extend to at least the top ends of eggs when positioned within said egg receiving pockets, a cover member for said carton, said cover member including a top portion of substantially the same dimensions outlined by the top edges of said end and side walls, a downwardly and inwardly depending resilient skirt extending from each of at least two opposite edges of said top portion and at least one downwardly depending rib member in said top portion and spaced from each of said skirts a distance for interlocking cooperation with the inner top edge portion of the adjacent wall of said carton.

4. The egg carton as set forth in claim 3 wherein said half posts are of a height corresponding to the height of the side and end walls and wherein each said rib member is positioned between a pair of adjacent half posts.

5. The egg carton as set forth in claim 3 wherein said half posts are of a height less than the height of said side and end walls and each said rib member depends downwardly for a distance not greater than the difference between the height of said half posts and the height of said side and end walls.

6. A molded egg carton comprising end walls, side walls, and a bottom portion, a plurality of spaced-apart egg supporting posts extending upwardly from the bottom portion and positioned to define individual egg receiving pockets within said carton, said supporting posts including inwardly extending half posts positioned along the side and end walls of said carton, said half posts being of a height corresponding substantially to the height of said side and end walls, said end and side walls extending to such a height above the bottom portion that the top edges of said walls extend to at least the top ends of eggs when positioned within said egg receiving pockets, foldable flap structure extending from the top edges of said side walls, said flap structure closing marginal side portions of the top of the carton when folded inwardly toward the carton interior, and a top cover member supported by and fixed to the exteriorly exposed surfaces of said inwardly folded flap structure.

7. The egg carton as set forth in claim 6 wherein said cover member is of a length greater than the length of said carton to provide an extended free end of said cover member.

8. The egg carton as set forth in claim 6 wherein the width of said cover member is greater than the width of said carton and the sides of said cover member are folded downwardly against the side walls of said carton and fixed thereto.

9. The egg carton as set forth in claim 6 wherein said cover member is sealed to said foldable flap structure.

References Cited in the file of this patent

UNITED STATES PATENTS

| | | |
|---|---|---|
| 1,990,145 | Swift | Feb. 5, 1935 |
| 1,991,424 | Sherman | Feb. 19, 1935 |
| 2,004,449 | Stanley | June 11, 1935 |
| 2,082,564 | Benoit | June 1, 1937 |
| 2,088,603 | Kronenberger | Aug. 3, 1937 |
| 2,160,893 | Newsom | June 6, 1939 |
| 2,974,842 | Reifers | Mar. 14, 1961 |

FOREIGN PATENTS

| | | |
|---|---|---|
| 496,007 | Great Britain | Nov. 23, 1938 |